United States Patent [19]

Jones

[11] Patent Number: 4,961,974
[45] Date of Patent: Oct. 9, 1990

[54] LAMINATED FILTERS

[75] Inventor: Roger L. Jones, Signal Mountain, Tenn.

[73] Assignee: Ahlstrom Filtration, Inc., Chatanooga, Tenn.

[21] Appl. No.: 321,037

[22] Filed: Mar. 3, 1989

[51] Int. Cl.$^5$ .................. B01D 39/16; B01D 39/18; B32B 5/24; B32B 5/26

[52] U.S. Cl. ..................... 428/34.2; 55/521; 55/524; 55/528; 55/DIG. 5; 55/DIG. 28; 55/DIG. 44; 428/36.1; 428/36.91; 428/93; 428/95; 428/96; 428/97; 428/181; 428/286; 428/287; 428/288; 428/311.5; 428/311.7; 428/316.6; 428/317.7; 428/317.9; 428/332; 428/340

[58] Field of Search ......... 55/521, 524, 528, DIG. 28, 55/DIG. 44; 428/34.2, 36.1, 36.91, 93, 95, 96, 97, 181, 286, 287, 288, 311.5, 311.7, 316.6, 317.7, 317.9, 332, 340

[56] References Cited

U.S. PATENT DOCUMENTS

| 4,540,625 | 9/1985 | Sherwood | 428/283 |
|---|---|---|---|
| 4,636,231 | 1/1987 | Thornton et al. | 55/318 |
| 4,666,479 | 5/1987 | Shoji | 55/358 R |
| 4,701,197 | 10/1987 | Thornton et al. | 55/524 |
| 4,728,349 | 3/1988 | Oshitari | 55/487 |
| 4,765,812 | 8/1988 | Homonoff et al. | 55/524 |
| 4,765,915 | 10/1988 | Diehl | 55/524 |

FOREIGN PATENT DOCUMENTS

| 43-16274 | 7/1968 | Japan . |
| 43-28530 | 12/1968 | Japan . |
| 55-99315 | 7/1980 | Japan . |

OTHER PUBLICATIONS

Meyer et al., "Production of Laminates and Nonwovens by Powder Bonding", Jan. 30, 1986, Insight '85 Advanced Forming/Bonding Conference, Oct. 27–29, 1985, Toronto, Canada.

*Primary Examiner*—James C. Cannon
*Attorney, Agent, or Firm*—Lyon & Lyon

[57] ABSTRACT

Laminated composite structures for use in making fluid filters are disclosed. Such structures comprise (a) a densified high loft layer of powder bonded nonwoven fabric, rebulkable by heating, laminated to (b) a filter media or element that supplies stiffness to the laminate. Also disclosed are methods of making fluid filters, e.g., ones used to filter inlet air for internal combustion engines, from such laminates, and fluid filters containing such laminates in which the nonwoven layer has been rebulked by heating.

20 Claims, 3 Drawing Sheets

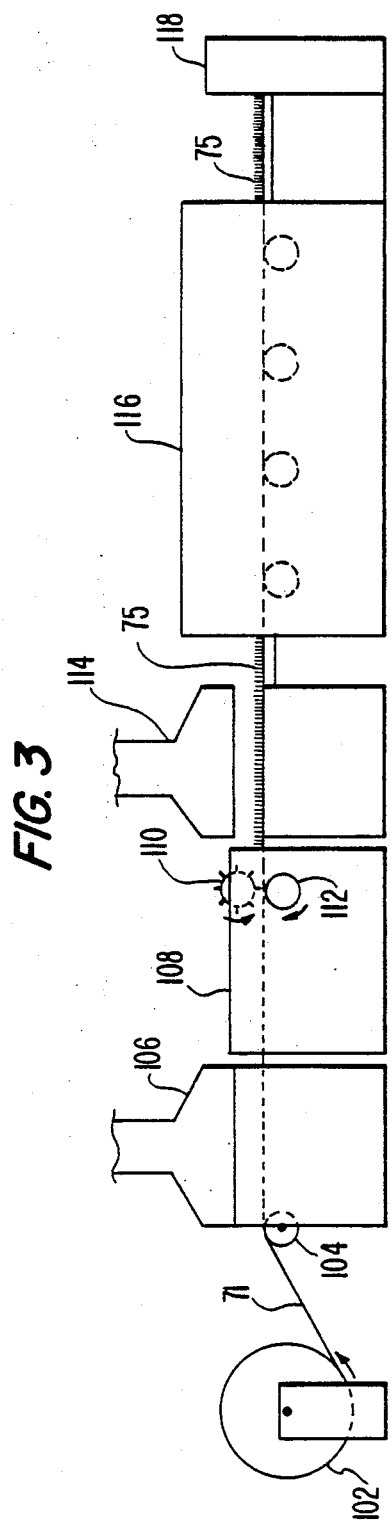

LAMINATED FILTERS

FIELD OF THE INVENTION

This invention relates to laminated fluid filters and methods for their preparation. More particularly, this invention relates to laminated filters used to filter inlet air for internal combustion engines, in which particular nonwoven fabrics are employed in combination with other filter media or elements.

BACKGROUND OF THE INVENTION

Composite fluid filters made up of two or more layers of filtering media are known in the art. Included among such filters are ones having at least one layer of a conventionally-prepared nonwoven fabric whose fiber content, at least in part, is made up of synthetic polymer fibers such as nylon (polyamide), polyester (e.g., polyethylene terephthalate), viscose rayon, cellulose acetate, polyolefin, acrylic or alkyl acrylate copolymer fibers. The fibers in these conventional nonwoven fabrics can be bonded together by heat, pressure or a combination of the two to fuse individual fibers together at their crossover points, or by applying to a fibrous mat or web a liquid adhesive substance, e.g., a natural or synthetic polymer latex such as one containing natural rubber, an acrylonitrile-butadiene or acrylonitrile-butadiene-styrene adhesive latex or emulsion, or the like. Mechanical means, e.g., needle punching, can also be used to bond such conventional nonwoven fabrics.

Composite filters in which conventional nonwoven fabrics are adhesively or mechanically bonded to each other or to other filter media are also known. Japanese Kokai No. 55-99315, published Jul. 29, 1980, for instance, discloses nonwoven air filters constructed from at least two layers of such nonwoven fabrics of coarse structure and having:

". . . an embossed pattern wherein a coarse structure and a dense structure are intermittently unitized."

This Kokai also speaks of filters with improved shape retaining properties as disclosed in Japanese Patent Publications Nos. 4316274 and 43-28530, such filters having partially heat fused surfaces, with these fused portions being converted into films having a deeply embossed structure.

U.S. Pat. No. 4,540,625, issued Sept. 10, 1985 to Sherwood, discloses flexible, air-permeable, highly absorbent fiber-particle composites useful as air filters in which a nonwoven substrate or nonwoven fibers are combined with in-situ formed organic polymer fibers and solid sorptive particles; see, e.g., column 2, lines 16-49.

Composite air filters made up of a pleated paper filtering medium and a non-woven filter batt are disclosed in U.S. Pat. No. 4,636,231, issued Jan. 13, 1987 to Thornton et al.; see, e.g., column 1, lines 24-47. Batts "made from fibers which are not thermoplastic but which [are] impregnated with a thermoset binder" are specifically disclosed.

U.S. Pat. No. 4,666,479, issued May 19, 1987 to Shoji, discloses air filters for semiconductor wafer containers which can be composites of one or more "filter films" (e.g., one produced from foamed urethane material) and a nonwoven sheet; see, e.g., from column 2, line 58 to column 3, line 16.

Dust filters made by depositing glass fibers by "papermaking methods" on a nonwoven thermoplastic fiber support are disclosed in U.S. Pat. No. 4,728,349, issued Mar. 1, 1988 to Oshitari; see, e.g., from column 1, line 63 to column 2, line 2. The use of "an adhesive binder" is disclosed at column 4, lines 5-13.

U.S. Pat. No. 4,765,812, issued Aug. 23, 1988 to Homonoff et al., discloses air laid fibrous filter media containing mixtures of small diameter and coarser fibers together with a binder material which can be a thermoplastic or thermosetting resin; see, e.g., column 2, lines 3-13 and from column 2, lines 62 to column 3, line 14.

SUMMARY OF THE INVENTION

It has now been discovered that laminated composite fluid filters, such as ones used to filter inlet air for internal combustion engines, that have improved filtering characteristics, that are easier to produce than other conventional filters, and that provide good filter efficiency—depth filtration coupled with improved dirt holding capacity per unit area of filter (thus providing equal or increased dirt holding capacity in a reduced filter area) and filter durability—are obtained when:

a densified high loft layer of powder bonded nonwoven fabric, rebulkable by heating, and a filter media or element that supplies stiffness and filtration efficiency to the laminate and to finished fluid filters prepared therefrom, are laminated, e.g., by adhesive lamination, and subsequently processed, such as by pleating, into a finished filter, heat being applied during processing to rebulk the densified high loft layer of powder bonded nonwoven fabric.

The laminated "thick" filters of this invention, despite the inclusion of the densified high loft layer of powder bonded nonwoven fabric, are nonetheless processable on conventional filter making equipment.

It is, therefore, an object of this invention to provide novel laminated composite fluid filters and methods for their preparation.

Another object of this invention is to provide novel laminated composite fluid filters useful to filter inlet air for internal combustion engines.

A further object of this invention is to provide novel laminated composite fluid filters containing, as one layer thereof, a rebulked high loft layer of powder bonded nonwoven fabric.

Yet another object of this invention is to provide novel intermediate products useful in making novel laminated composite finished fluid filters, such intermediate products being made up of a densified high loft layer of powder bonded nonwoven fabric, rebulkable by heating, laminated to a filter media that supplies stiffness and filtration efficiency to the laminated structure.

These and other objects, as well as the nature, scope and utilization of this invention, will become readily apparent to those skilled in the art from the following description, the drawings, and the appended claims.

BRIEF DESCRIPTION OF THE DRAWINGS

FIG. 3 is a schematic illustration of a method of producing a finished, pleated filter element containing a laminated intermediate made from a densified high loft layer of powder bonded nonwoven fabric, rebulkable by heating, adhesively bonded to another filter media that supplies stiffness and filtration efficiency to the laminate and thus to the ultimately produced finished fluid filter, the laminated intermediate being one made in accordance with this invention.

DETAILED DESCRIPTION OF THE INVENTION

The powder bonded nonwoven fabric used in practicing this invention can be produced by carding the fibers being used, then forming, preferably by dry-laying on a conveyer, a layer of the carded fibers, and then applying a powdered bonding material to the resultant layered web and distributing the bonding material through the web. The fibrous web is next passed through a heating zone in which the particles of powdered bonding material are softened or melted, and then through a zone in which the web is compressed in order to increase the contact of the molten or softened bonding material with fibers and densify these loftable fibers, after which the resultant material is cooled in order to solidify the bonding material and thereby to bond the fibers at points throughout the fiber matrix.

Figure 1:
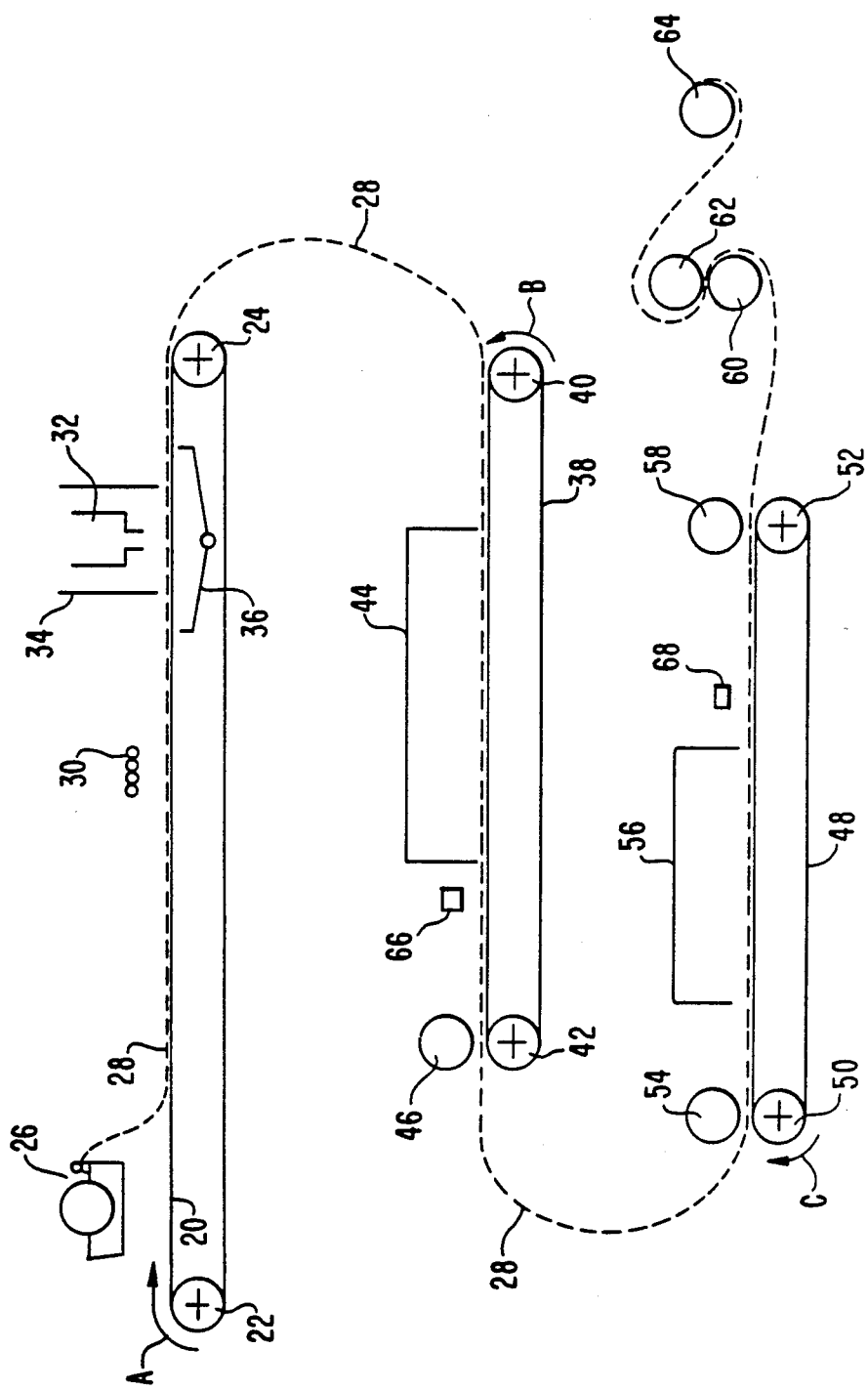
FIG. 1 is a schematic illustration of a process for producing densified high loft powder bonded nonwoven fabric for use in practicing this invention.

The technology for producing single-phase powder bonded nonwovens is known (see, for example, Meyer et al., "Production of Laminates and Nonwovens by Powder Bonding", a paper presented at the INSIGHT '85 Advanced Forming/Bonding Conference, 27–29 Oct., 1985, Toronto, Canada). By way of illustration, the production of a powder bonded nonwoven fabric suitable for use in practicing this invention is next described with reference to the production line shown schematically in FIG. 1.

This production line comprises an open-mesh conveyer belt 20 which is driven around the rollers 22, 24 in the direction indicated by the arrow A. One or more textile cards, represented by the single device 26, are provided in order to deposit a layer or web 28 of fibers on the upper surface of the conveyer belt 20. Any fiber typically employed in making nonwoven fabrics can be employed, such as polyethylene, polypropylene, rayon, acrylics, e.g., Orlon polyacrylonitrile fibers, nylons, e.g., nylon 4, 6, 6/6 or 6/12 fibers, polyester, e.g., Fortrel, Dacron or Kodel polyethylene terephthalate fibers, carbon/graphite fibers, e.g., carbonized nylon or carbonized acrylic fibers, Thunderon or Fibrix fibers, and the like, as well as blends of such fibers, e.g., rayon/polypropylene blends. Electrically conductive fibers, and fibers of varying cross-sections, e.g., round trilobal, pentalobal, Y-, H- or I-cross-section fibers, hollow-cross-section fibers, or the like, can be used. Polyester staple fibers whose denier ranges from about 1.0 to about 8.0, of from about ¾ inch to about 2 ½ inches in average staple length, are particularly preferred, as are finished densified high loft powder bonded nonwoven fabrics having a basis weight of from about 25 to about 100 g/m², preferably from about 30 to about 60 g/m².

Antistatic fibers in which antistatic properties have been built into the fiber itself or into the materials, e.g., synthetic polymers, from which these fibers are prepared, as well as fibers to which antistatic finishes, including conventionally-applied anionic, cationic, nonionic or amphoteric antistatic finishes, have been applied to the fiber prior to its being deposited on the conveyer belt 20 or subsequent to its deposition but prior to the application of the powder bonding material, by any convenient means such as overspraying, saturate printing, foaming or coating, may be used to prepare the powder bonded nonwoven fabrics employed in practicing the present invention.

In all cases when practicing this invention, lofting capability is necessary in all or a preponderance of the fibers used to make up the nonwoven fabric. Lofting capability can be achieved in a variety of ways well known in the art. For instance, crimped fibers can be used, including crimped polyester fibers, e.g., crimped polyester fibers having hollow cross-sections such as those marketed by Eastman Chemical Products, Inc. for fiberfill applications.

The fiber layer or web 28 is passed through a web-spreading section 30 and then to a zone in which powdered bonding material is applied to the web. This zone is represented by the powder-depositing device 32 (although in practice a plurality of such devices may be used). Suitable powder-depositing devices are powder applicators of known type in which a wired roller takes powder into the space between the wires and, upon rotation, drops the powder out of that space onto the fibrous web passing beneath it. A screw 34 may be provided in order to raise or lower the roller of the powder-depositing device 32. A receptacle 36 is also provided to catch any excess powder that falls through the open-mesh conveyer belt 20, the powder so collected being available for recycling.

It will be appreciated, of course, that as an alternative to mechanical powder-depositing devices other applicators such as a fluidizing air spray or an electrostatic spray-gun can be employed, as can devices that apply the powder in a liquid carrier or as a component of a foam.

The bonding powder should have a lower melting point than the fibers in the fabric web. In general, the bonding powder will be a thermoplastic material, and it should be capable of forming a good adhesive bond with the fibers being used. In the case of polyester fibers, polyester bonding powders are particularly preferred, for example the polyester powders available from Eastman Chemical Products Inc. as hot-melt adhesives under the trademark "Eastobond". Typical polyester powder adhesives have melting points of from 100 to 130° C. and are available as coarse powders (200–420 microns or 70–40 U.S. standard mesh), medium powders (80–200 microns or 200–70 U.S. standard mesh) and fine powders (180 microns or less, or finer than 200 U.S. standard mesh), the medium powders being preferred when using mechanical applicators. The amount of powder deposited in the web will usually be from about 5 to about 50% of the total fabric weight, preferably from about 10 to about 20%.

The fiber layer or web 28, now with bonding powder distributed through it, is transferred from the conveyor belt 20 to a further conveyor belt 38, for example one made of Teflon polytetrafluorethylene-coated fiberglass, which belt 38 is driven round rollers 40, 42 in the direction indicated by the arrow B and serves to carry the fibrous web 28 through an infrared oven 44. Within the oven 44, the bonding powder fuses and bonds the fibers of the web 28 at fiber crossover points where the fibers and the bonding material come into contact. Upon leaving the oven 44, the web 28 is subjected to light pressure by means of the nip roll 46.

It has been found that the strength of the web material can be improved by reheating. Accordingly, the web 28 leaving the nip roll 46 is transferred to another conveyor belt 48 which is driven round rollers 50, 52 in the direction indicated by the arrow C. As it contacts the conveyor belt 48, the web 28 is carried beneath a lightweight roller 54. The web 28 is then carried through a second infrared oven 56 and thereafter is subjected to further compression by means of the nip roll 58. The nip rolls 46 and 58 may be heated during start-up but thereafter are generally cooled during operation. The rollers 40, 42 and 50, 52 may also be water-cooled in order to prevent an excessive build-up of temperature due to the transfer of heat from the infrared ovens 44 and 56. The resultant web 28 is then further cooled by passing it around the water-cooled cans 60, 62, or by air-cooling, following which the web is wound into a roll on a winder 64 and subsequently slit to usable widths by means not shown.

Suitable oven temperatures will depend upon the bonding powder that is used and will be ascertainable from simple trials or from the literature provided by the supplier of the bonding powder. Typically, however, the temperatures in the infrared ovens 44 and 56 will be within the range of from about 80° C. to about 200° C. The temperature of the web emerging from the ovens 44 and 56 may be monitored, for example by means of infrared devices 66 and 68, respectively. It will be appreciated, of course, that the infrared ovens 44 and 56 can be replaced by other heating devices, e.g., calenders, hot-air ovens, steam presses and heated contact cans with non-stick surfaces. The dwell time of the web in each oven will depend upon the line speed that is achievable, and other factors, but may typically be from about 20 seconds to about 2 minutes.

The pressures applied by the nip rolls 46 and 54 will depend upon the materials used, the desired characteristics of the web, and the production line conditions; normally, pressures of up to about 20 kg/cm of roll face width are used.

The initial thickness of the densified high loft powder bonded nonwoven fabric, i.e., its thickness as it is obtained from the production line, will be typically from about 0.25 to about 1 mm. Upon subsequent lofting or rebulking when heated following adhesive lamination to the saturated filter media, as described infra, this fabric typically will increase in thickness from about 5 to about 10 times, e.g., about 3-6 times, this initial thickness.

Preferred densified high loft powder bonded nonwoven fabrics for use in practicing this invention include Bonar Fabrics Corp.'s Style 9230, Style 9260 and Style 9290, loftable (rebulkable) powder bonded nonwoven polyester fabrics having a basis weight of 30 g/yd$^2$, 60 g/yd$^2$ and 90 g/yd$^2$, respectively, each containing 5.5 denier hollow core crimped polyester fibers, manufactured and sold by Bonar Fabrics Corporation, Greenville, S.C.

The second component of the novel laminated structures of this invention—a filter media that supplies stiffness to the laminate—can be a sheet or fabric, preferably nonlofted, made of any material having a Gurley stiffness (TAPPI Test No. T543) sufficient for the particular filtration conditions to which a filter made up entirely of or containing, as an essential element, such a laminated structure, will be subjected. Such Gurley stiffnesses can, for example, range from about 2,000 to about 25,000 mg, preferably from about 3,000 to about 5,000 mg, and can be achieved using nonwoven or woven sheets or fabrics made up of fibers that impart the requisite stiffness themselves, e.g., Reemay 2470 or Typar T198 fabrics (E.I. du Pont de Nemours & Co.), or woven or nonwoven sheets or fabrics made up of cellulosic fibers alone or admixed with polyester fibers, nylon fibers, acrylic fibers, fiberglass fibers, "Nomex" or "Kevlar" aromatic polyamide fibers (E.I. du Pont de Nemours & Co.), carbon fibers, ceramic fibers, or the like that have been saturated with a stiffening polymer applied from a polymer solution or latex, e.g., a phenol-formaldehyde or aminoplast resin, a polyvinyl acetate resin, an acrylic resin, a styrene-butadiene resin, an acrylonitrile-butadiene-styrene resin, or the like.

Typically for filters used to filter air for internal combustion engines, the laminated structures of this invention used in such filters will contain stiffening sheets or fabrics having Gurley stiffnesses ranging from about 1,500 to about 3,000 mg, and preferably will be a Reemay sheet or a cellulosic sheet saturated with phenol-formaldehyde or polyvinyl acetate resin.

The densified high loft powder bonded nonwoven fabric is then bonded to the stiffening filter media. This is preferably accomplished by adhesively bonding these two elements, but other bonding techniques, such as hot calender bonding in which the elements are bonded by means of the powder bonding adhesive, the fibers, or both in the nonwoven fabric, or by a saturating resin used in the stiffening filter media, can also be used. Adhesive bonding is preferably accomplished, for example, by feeding each of the filter components to a laminating means, e.g., the arrangement of feed rolls and gravure roll shown in FIG. 2, applying a laminating adhesive, such as a polyvinyl acetate water based adhesive, an acrylic water based adhesive, or the like, to one or both of these components at their facing surfaces, e.g., at the gravure roll 82 in the arrangement shown in FIG. 2, and then bonding the filter components by subjecting them to bonding or curing means, for example the arrangement of bonding or curing means shown in FIG. 2.

Figure 2:
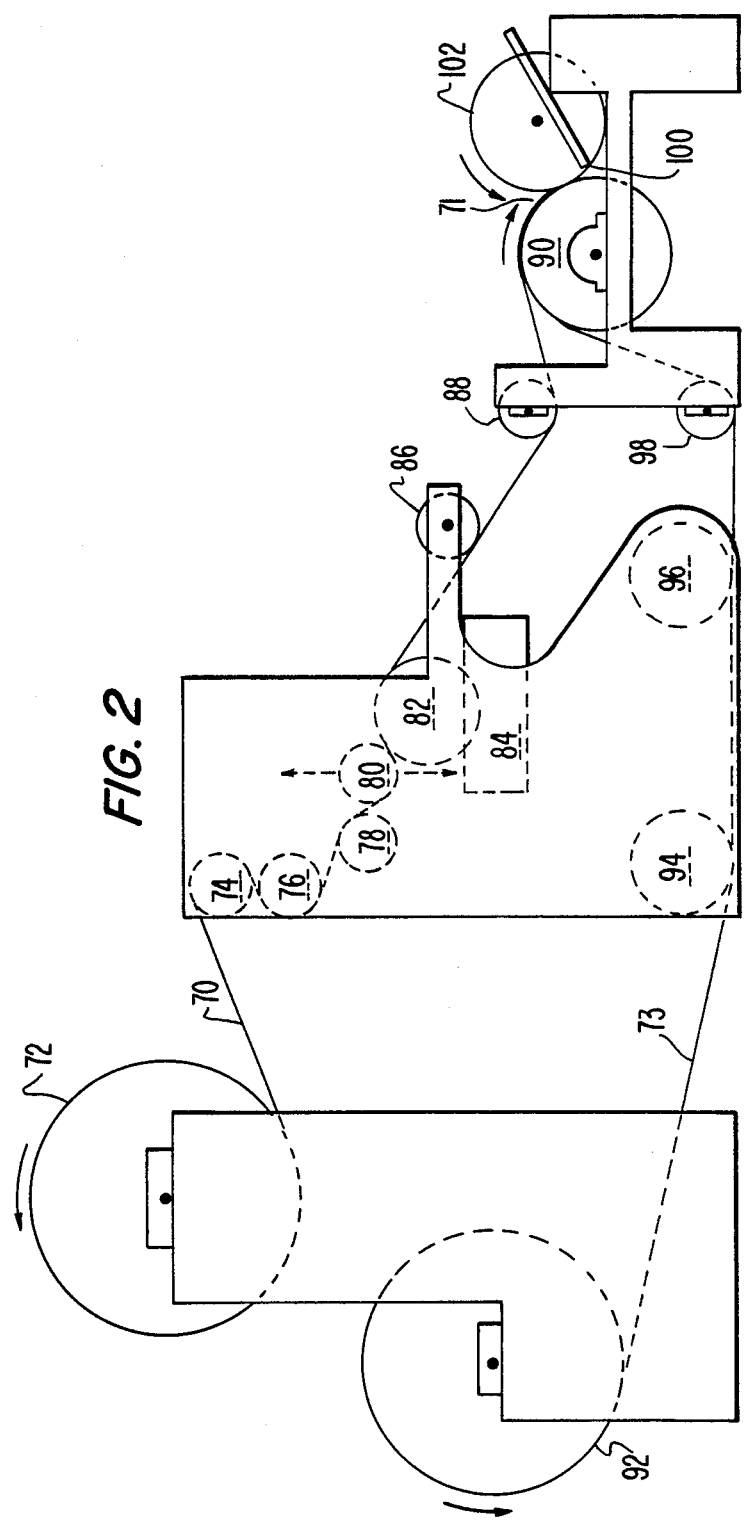
FIG. 2 is a schematic illustration of a method of adhesively laminating a densified high loft layer of powder bonded nonwoven fabric, rebulkable by heating, together with another filter media that supplies stiffness and filtration efficiency to the laminate and thus to the ultimately produced finished fluid filter. This method produces a novel intermediate product in accordance with this invention which can then be used by a filter manufacturer to make novel laminated composite finished fluid filters in which the densified high loft layer of powder bonded nonwoven fabric in the laminate has been rebulked by heating.

With particular reference to FIG. 2, a web 70, preferably a densified high loft powder bonded nonwoven fabric such as Bonar Fabrics Corp.'s Style 9230, but which can be a stiffening filter media instead, is unwound from a roll 72 across the feed rolls 74, 76, 78 and 80, onto a gravure roll 82, where a laminating adhesive is applied to the web 70 from a reservoir 84. The roll 80 is an adjustable roll which serves to increase or decrease the wrap of the web 70 across the gravure roll 82 to cause more or less adhesive to be applied to the web 70 from the reservoir 84. The web 70 next passes beneath the rolls 86 and 88 and then across a drum roll 90 where it comes in contact with a web 73, preferably a stiffening filter media such as a cellulosic fabric—although when the web 70 is a stiffening filter media the web 73 will be a densified high loft powder bonded nonwoven fabric—which has been unwound from a roll 92 and passed beneath the rolls 94, 96 and 98. The thus-combined webs 71, constituting an adhesively-bonded laminate, are passed across the drum roll 90, thence through the nip 100 formed by the drum roll 90 and a windup roll 102, onto which the adhesively-bonded laminate formed of the combined webs 71 is wound for use as the feed to the next stage (curing with or without pleating) of the process.

Typical line speeds at which the laminating arrangement of FIG. 2 is run can vary from about 600 to about 700 feet per minute.

With particular reference to FIG. 3, a web 71 constituting an adhesively-bonded laminate is unwound from a wind-up roll 102 and threaded over a roll 104 beneath a preheating unit 106. The preheating unit may or may not be used depending on the material being processed. The web 71 can next be passed through a pleater 108 to form multiple pleats in the web in a direction generally perpendicular to the longitudinal axis of the web, i.e., across the web, so that in a finished cylindrical filter cartridge the pleats are generally parallel to the longitudinal axis of the cylinder. The pleating means used can be, for example, a pair of rolls 110 and 112 as illustrated in FIG. 3, in which the roll 110 can be equipped with evenly spaced longitudinal bars, parallel to the axis of the roll or approximately so (shown in end view in FIG. 3), which score the web 71 and allow it to fold on the scores as it exits the pleater 108. As is known, the greater the number of pleats introduced, the greater the available filtration area. The pleated web 75 is then conveyed beneath a postheating unit 114 which, like the preheating unit 106 will be used only if the material being processed requires heating at this point in the process. The pleated web 75 exiting the postheating unit 114 is conveyed through a curing oven 116, in which heat is applied to the web to rebulk its densified high loft powder bonded nonwoven fabric component. The pleated web 75 is allowed to expand freely while in its pleated configuration in the curing oven 116.

The temperature and duration of heating can vary depending on the particular nonwoven fabric being rebulked, e.g., temperatures ranging from about 350° F. to about 450° F., and preferably about 390° F. to about 410° F., applied during dwell times ranging from about 1 to about 30 minutes, and usually from about 5 to about 10 minutes, when the nonwoven fabric comprises polyester fiber, but these conditions are, in all cases, readily ascertainable by those skilled in the art. The rebulking or lofting mechanism can be explained as follows, with reference to the preferred embodiments described above. As laid down, the precursor of the nonwoven fabric will be thick and of low density owing to the highly crimped form of the fibers that are used. When this web is powdered and compressed (e.g., calendered) in the fabric-making process, the adhesive powder bonds hold down the fibers and constrain them in a flat sheet form. It is in this densified or compressed form that the fabric is removed from the fabric-making line. Lofting occurs when the adhesive powder bonds are softened by heat. The adhesive bonding material melts at a temperature (typically 110° to 130° C.) that is much lower than the melting temperature of the fibers (typically 250° to 290° C). When heated, therefore, the powder bonds soften and allow the fibers to "regain their memory" and thereby tend to return to the thick, low density form that they were in prior to adhesive bonding. Typically, the lofting temperature will be in the range of about 20° C. to about 50° C. above the melting point of the powdered adhesive used. The lofted fabric then allowed to cool in its lofted state and the adhesive resets, thereby stabilizing the fabric in its lofted form.

The rebulked web 75 exiting the curing oven 116 can then be cut to suitably sized pieces for use in preparing fluid filters. For example a counter/separator, indicated at 118, can be used to cut and stack multiple pieces of rebulked web 75 into pleat packs for further processing into fluid filters.

Cylindrical fluid filters can then be made from the laminate by conventional filter-forming processes. For example, a manufacturer of filters used to filter inlet air for internal combustion engines will typically pleat and rebulk an appropriately-sized laminate made in accordance with this invention, place the pleated laminate in a filter cartridge in generally cylindrical form with the laminate's pleats generally parallel to the longitudinal axis of the filter cartridge, preferably together with one or more conventionally-employed filter components, e.g., a wire screen element to impart additional strength to the structure and a pair of plastisol end caps to seal the structure, and then edge-seal this structure using a plastisol or the like.

Flat filters using laminates made in accordance with this invention can also contain one or more conventionally-employed filter components together with a laminate or laminates made in accordance with this invention, preferably pleated laminates. Such filters ordinarily will contain no wire screen reinforcement, although plastic membranes or screening to provide support can be used, if necessary. The thus-obtained flat filter structures can be edge-sealed using a polyurethane or urea-formaldehyde foam sealant.

Ordinarily but not necessarily, the air flow into such cylindrical and flat filters will be perpendicular to the filter surface, e.g., from the side of a cylindrical filter cartridge.

Table I below contains data comparing the filtration capacity and efficiency of (1) a laminated composite structure made in accordance with this invention by bonding one sheet of Bonar Fabrics Corp.'s Style 9290 loftable powder bonded nonwoven polyester fabric to one sheet of Filtration Sciences Corp.'s 2N56 cellulosic flat filter media (68 lb. basis weight, containing approximately 16% by weight of H.B. Fuller PN 3282N water based polyvinyl acetate saturant) using Jedco Chemical Corp.'s Jedbond 71-240 E water based polyvinyl acetate adhesive as the laminating adhesive, pleating to give 597 square inches of filter surface area and heating during pleating to rebulk the nonwoven fabric, (2) a second laminated composite structure made in accordance with this invention by bonding one sheet of Bonar Fabrics Corp.'s Style 9290 loftable powder bonded nonwoven polyester fabric to one sheet of Filtration Sciences Corp.'s 2N-56 cellulosic flat filter media using Jedbond 71-240 E water based adhesive, pleating to give 896 square inches of filter surface area and heating during pleating to rebulk the nonwoven fabric, and (3) a standard fluid filter element consisting of one sheet of Filtration Sciences Corp.'s 2N-32 grooved cellulosic filter media (73 lb. basis weight, containing approximately 16% by weight of H.B. Fuller PN 3282N water based adhesive), pleated to give 1230 square inches of filter surface area.

Filtration capacity and efficiency for these three filters was determined using the Society of Automotive Engineers' test No. SAE J726, in which all three filters were tested using air flowing at a rate of 150 scfm (standard cubic feet per minute), containing as the contaminant AC Coarse Test Dust added at the rate of 3.2 g/min. to the flowing air, until the pressure in the filter reached the level of 10 inches of water, at which point the test was stopped for the particular filter. Filters (1) and (3) each performed for 60 minutes before reaching terminal pressure, filter (2) for 100 minutes. Each filter was tested at 72° F., but since the tests were run on different days the barometric pressures at which the tests were conducted were 30.83 for filter (1), 30.18 for filter (2) and 30.50 for filter (3).

TABLE I

| Filter | Sq. In. of Filter Surface Area | Filtration Capacity | Filtration Efficiency |
|---|---|---|---|
| Laminated Filter (1) | 597 | 157.3 | 99.5 |
| Laminated Filter (2) | 896 | 274.6 | 99.7 |
| Standard Filter (3) | 1230 | 162.3 | 98.6 |

The above discussion of this invention is directed primarily to preferred embodiments and practices thereof. It will be readily apparent to those skilled in the art that further changes and modifications in the actual implementation of the concepts described herein can easily be made without departing from the spirit and scope of the invention as defined by the following claims.

I claim:

1. A laminated composite structure for use in making fluid filters comprising:
   (a) a densified high loft layer of powder bonded nonwoven fabric, rebulkable by heating, bonded to
   (b) a filter media that supplies stiffness and filtration efficiency to the laminate and to finished fluid filters prepared therefrom.

2. A laminated composite structure as described in claim 1 in which the nonwoven fabric is a polyester fabric.

3. A laminated composite structure as described in claim 2 in which the nonwoven fabric comprises polyester staple fibers.

4. A laminated composite structure as described in claim 3 in which the polyester staple fibers are crimped.

5. A laminated composite structure as described in claim 4 in which the polyester staple fibers have deniers ranging from about 1.0 to about 8.0 and average staple lengths ranging from about ¾ inch to about 2 ½ inches.

6. A laminated composite structure as described in claim 5 in which the nonwoven fabric has a basis weight of from about 25 to about 100 g/m².

7. A laminated composite structure as described in claim 1 in which the bonding powder used to bond the nonwoven fabric has a lower melting point than the fibers in the fabric.

8. A laminated composite structure as described in claim 7 in which the bonding powder is a polyester bonding powder.

9. A laminated composite structure as described in claim 1 in which the filter media is a sheet or fabric having a Gurley stiffness of from about 2,000 to about 25,000 mg.

10. A laminated composite structure as described in claim 9 in which the filter media is a cellulosic sheet.

11. A laminated composite structure as described in claim 10 in which the cellulosic sheet is saturated with a stiffening polymer.

12. A laminated composite structure as described in claim 11 in which the stiffening polymer is a polyvinyl acetate resin.

13. A laminated composite sheet as described in claim 1 in which the nonwoven fabric is adhesively bonded to the filter media by means of a laminating adhesive.

14. A laminated composite structure as described in claim 13 in which the adhesive is a polyvinyl acetate water based adhesive.

15. A laminated composite structure for use in making fluid filters comprising:
   (a) a densified high loft layer of powder bonded nonwoven polyester fabric, rebulkable by heating, comprising crimped polyester staple fibers bonded with a polyester bonding powder, and
   (b) a filter media that supplies stiffness and filtration efficiency to the laminate and to finished fluid filters prepared therefrom, comprising a cellulosic sheet saturated with a polyvinyl acetate resin, the nonwoven fabric being adhesively bonded to the filter media by means of a polyvinyl acetate water based adhesive.

16. A laminated composite structure for use in making fluid filters as described in claim 15, which composite structure contains multiple pleats.

17. A fluid filter comprising a laminated composite structure as described in claim 16, the composite structure being rebulked and contained in a filter cartridge in generally cylindrical form with the composite structure's multiple pleats being generally parallel to the longitudinal axis of the filter cartridge.

18. A flat fluid filter comprising a laminated composite structure as described in claim 16, the composite structure being rebulked and contained in a filter cartridge.

19. A fluid filter for filtering air for internal combustion engines comprising a rebulked laminated composite structure as described in claim 1.

20. A fluid filter for filtering air for internal combustion engines comprising a rebulked laminated composite structure as described in claim 16.

* * * * *